US012560890B2

(12) United States Patent
Enggist et al.

(10) Patent No.: US 12,560,890 B2
(45) Date of Patent: Feb. 24, 2026

(54) PROCESS FOR MANUFACTURING A DIAL

(71) Applicant: Rubattel & Weyermann S.A., La Chaux-de-Fonds (CH)

(72) Inventors: Yann Enggist, Ins (CH); Frédéric Jeanrenaud, La Chaux-de-Fonds (CH)

(73) Assignee: Rubattel & Weyermann S.A., La Chaux-de-Fonds (CH)

( * ) Notice: Subject to any disclaimer, the term of this patent is extended or adjusted under 35 U.S.C. 154(b) by 498 days.

(21) Appl. No.: 18/062,650

(22) Filed: Dec. 7, 2022

(65) Prior Publication Data

US 2023/0195035 A1 Jun. 22, 2023

(30) Foreign Application Priority Data

Dec. 20, 2021 (EP) ...................................... 21216095

(51) Int. Cl.
*G04B 19/10* (2006.01)
*B29C 45/14* (2006.01)
*G04D 3/00* (2006.01)
B29L 31/00 (2006.01)

(52) U.S. Cl.
CPC ........ *G04B 19/10* (2013.01); *B29C 45/14336* (2013.01); *B29C 45/14754* (2013.01); *G04D 3/0048* (2013.01); *B29L 2031/739* (2013.01)

(58) Field of Classification Search
CPC .............................. G04B 19/10; G04D 3/0048
See application file for complete search history.

(56) References Cited

U.S. PATENT DOCUMENTS

| | | | |
|---|---|---|---|
| 6,404,704 B1 | 6/2002 | Bossel et al. | |
| 7,556,759 B2 * | 7/2009 | Hiemstra ............ | B29C 45/0003 |
| | | | 264/297.1 |
| 2002/0068148 A1 * | 6/2002 | Nakamura ............... | C25D 1/10 |
| | | | 428/156 |

(Continued)

FOREIGN PATENT DOCUMENTS

| | | |
|---|---|---|
| EP | 1 035 453 B1 | 6/2004 |
| GB | 2 027 636 A | 2/1980 |

(Continued)

OTHER PUBLICATIONS

European Search Report issued May 24, 2022 in European Application 21216095.6, filed on Dec. 20, 2021 (with English Translation of Categories of Cited Documents), 3 pages.

(Continued)

*Primary Examiner* — Kyle A Cook
(74) *Attorney, Agent, or Firm* — Oblon, McClelland, Maier & Neustadt, L.L.P.

(57) ABSTRACT

A process for manufacturing a watch dial including at least one pattern on a visible face of the dial, the process including: a step of designing a support plate including a dial blank, this step including producing several through holes in the thickness of the body of a support plate, the holes delimiting in such a plate the edge of the dial blank, and a step of producing at least one pattern on a visible face of the dial blank during which step the following is performed: an arrangement of this support plate including the external part element in a mould, and a construction of a blank of each pattern on the visible face of the dial blank, as well as a finalisation of the blank of the pattern.

10 Claims, 4 Drawing Sheets

(56)                    References Cited

U.S. PATENT DOCUMENTS

| 2004/0154529 | A1* | 8/2004 | Nogiwa | ............... | H05K 3/0058 |
| | | | | | 117/200 |
| 2009/0133241 | A1* | 5/2009 | Storrs | ............... | B29C 45/14016 |
| | | | | | 29/429 |
| 2015/0118479 | A1* | 4/2015 | Hon | ........................ | B32B 3/263 |
| | | | | | 428/312.8 |
| 2020/0398465 | A1 | 12/2020 | Enggist et al. | | |
| 2022/0250294 | A1* | 8/2022 | Nakamura | .......... | B29C 45/2708 |

FOREIGN PATENT DOCUMENTS

| JP | 2007-46984 A | 2/2007 |
| WO | WO 2019/185422 A1 | 10/2019 |

OTHER PUBLICATIONS

Office Action issued Jan. 30, 2024, in corresponding Japanese Patent Application No. 2022-200994 (with English Translation), 11 pages.

* cited by examiner

PROCESS FOR MANUFACTURING A DIAL

CROSS-REFERENCE TO RELATED APPLICATION

This application claims priority to European Patent Application No. 21216095.6 filed on Dec. 20, 2021, the entire disclosure of which is hereby incorporated herein by reference.

TECHNICAL FIELD OF THE INVENTION

The invention relates to a process and a system for manufacturing a dial of a watch provided with at least one pattern comprised on a surface of this dial intended to be arranged facing a glass/crystal of the watch.

The invention also relates to the dial comprising this pattern.

The invention also relates to the watch including such a dial.

TECHNOLOGICAL BACKGROUND

Processes for manufacturing dials generally comprise machining operations of a visible surface of this dial before producing appliques. Such appliques are often produced using transfer, or silkscreen or forming operations of the bottom surface of the dial. Stamping/machining operations of a metal plate followed by gluing on the visible surface of this dial can also be implemented to produce such appliques.

However, the solutions proposed by these processes remain unsatisfactory with regard to dial manufacturing requirement criteria which are particularly: the aesthetic appearance, the lack of defects or scratches that can result from the machining operations and robustness.

In this context, it is understood that there is a need to develop alternative solutions not having the drawbacks cited above.

SUMMARY OF THE INVENTION

The aim of the present invention is that of remedying all or some of the drawbacks cited above by proposing a process and a system for manufacturing a watch dial which is of high quality with a high versatility and durable over time.

To this end, the invention relates to a process for manufacturing a watch dial comprising at least one pattern on a visible face of the dial, said process comprising:

a step of designing a support plate comprising a dial blank, this step comprising producing several through holes in the thickness of the body of a support plate, said holes delimiting in such a plate the edge of the dial blank, and a step of producing at least one pattern on a visible face of said dial blank during which step the following is performed:

an arrangement of this support plate comprising the external part element in a mould formed by the reversible assembly of a first and a second parts, said arrangement step comprising a sub-step of forming at least one cavity in this mould by associating the first part including at least one impression with the visible face of the dial blank;

a construction of a blank of each pattern on the visible face of the dial blank, said step comprising a sub-step of over-moulding by injecting an injectable material into the cavity via a through opening arranged in said dial blank provided with an entry orifice of said cavity;

a finalisation of the blank of the pattern comprising a sub-step of removing said mould from the support plate comprising the dial blank provided with at least one blank of a pattern over-moulded on the face thereof.

In other embodiments:

the finalisation step comprises a sub-step of applying a coating on all or part of said blank over-moulded on the dial blank after carrying out a sub-step of disassembling the first part from the second part of the mould;

the finalisation step comprises a sub-step of applying a coating on all or part of said blank over-moulded on the dial blank after carrying out the sub-step of removing.

the design step comprises a sub-step of creating at least one through opening and at least one blind opening in the thickness of the dial blank;

the design step comprises a sub-step of applying at least one coating on a top face of this dial blank;

said arrangement step comprises a sub-step of reversible assembly of the second part with the support plate comprising the dial blank, said sub-step comprising a connection phase of one end of an injection circuit arranged in this second part with the entry orifice of the through opening of the dial blank;

said removal sub-step comprises a phase of breaking an injection point connecting said dial blank to the second part;

the over-moulding sub-step comprises a phase of regulating the temperature of said mould particularly during a period spreading from before the start of the phase of injecting injectable material into the cavity to the end of this material injection phase or after this end of this injection phase;

the over-moulding sub-step comprises a phase of evacuating said cavity before the phase of injecting the injectable material into this cavity;

the application sub-step comprises a phase of depositing a decorative and/or functional material on a visible outer face of the blank of the pattern over-moulded on the dial blank;

the process comprises a step of preparing at least one impression in the first part using at least one original part relative to said at least one pattern to be manufactured.

The invention also relates to a system for manufacturing a watch dial comprising at least one pattern on a visible face of the dial implementing this process, the system comprising:

a device for designing a support plate comprising dial blank, and a mould formed by the reversible assembly of a first part and a second part configured to receive a support plate of the dial blank, the mould comprising at least one cavity formed by associating the first part including at least one impression with the visible face of the dial blank, each cavity helping produce a blank of the pattern from an over-moulding by injecting injectable material onto said visible face.

The invention also relates to a dial for a watch comprising at least one pattern capable of being produced on the visible face thereof using this process.

The invention also relates to a watch comprising such a dial.

BRIEF DESCRIPTION OF THE FIGURES

Other aims, advantages and features of the present invention will become more apparent from the following description, made with reference to the appended figures listed below.

DETAILED DESCRIPTION OF THE INVENTION

Figures 1, 2:
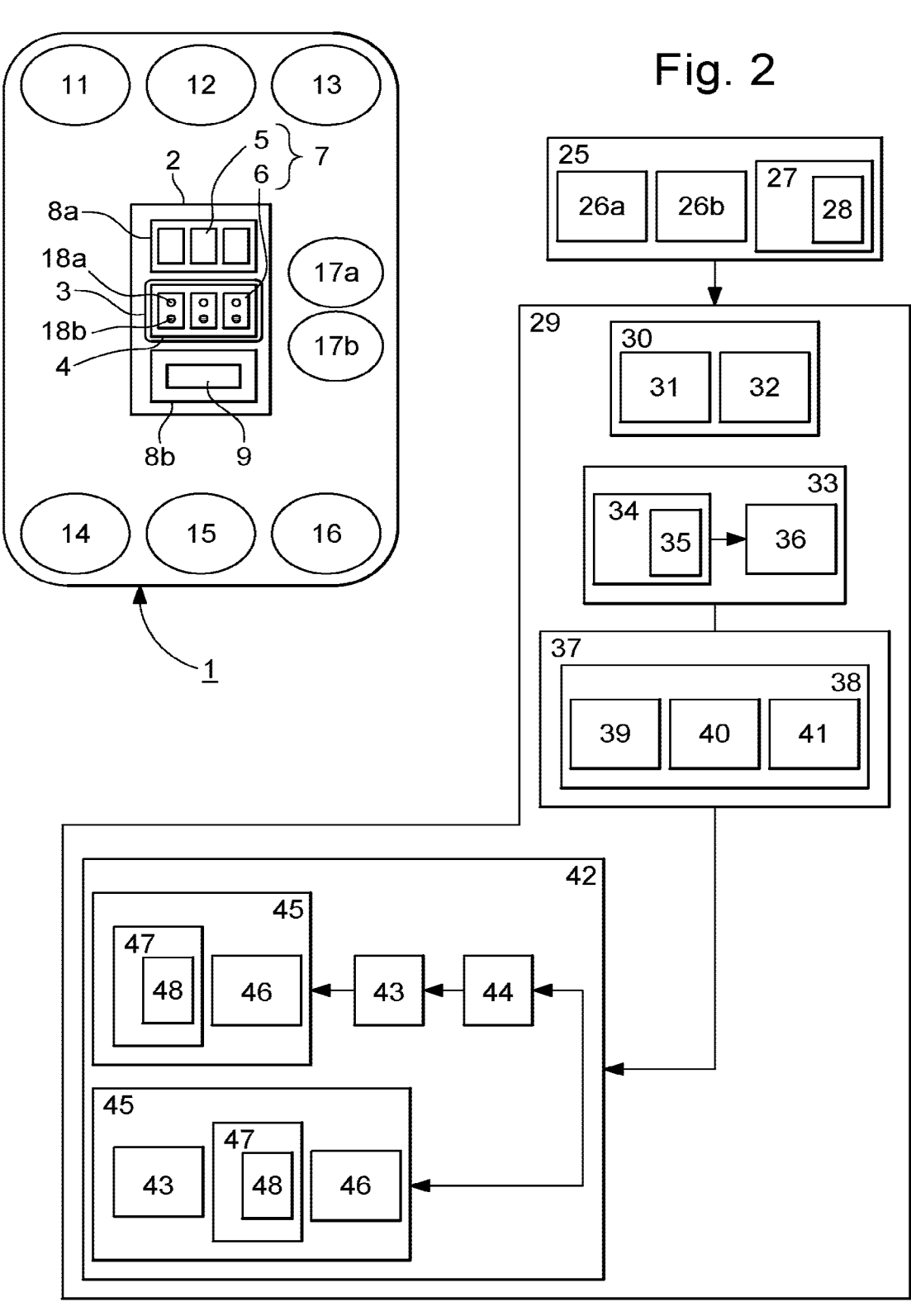
FIG. 1 is a representation of a system for manufacturing a watch dial provided with at least one pattern, according to an embodiment of the invention.
FIG. 2 is a logic diagram relating to a process for manufacturing the dial provided with at least one pattern, according to the embodiment of the invention.

FIG. 1 shows a schematic representation of a system 1 for manufacturing a watch dial provided with at least one pattern. This pattern 10 represented in FIGS. 1, 3, 4 to 9, is produced on a visible face 21a, also referred to as top face, of this dial 4 (or of the dial blank used for the fabrication of this dial) i.e. on a face 21a which can be viewed by the wearer of the watch 100 when this dial 4 is mounted in this part 100. This face 21a of the dial 4 is referred to as "visible" with reference to the possibility that it has of being perceived when it is fitted in the watch 100 and, unlike the other face 21b of this dial 4 which is opposite this visible face 21a for example when this element 4 is a dial.

Such a system 1 is capable of being implemented within an automatic assembly installation (or automatic assembly line) dedicated to the manufacture of all of part of a watch 100. In such a context, this system 1 helps manufacture and ensure the distribution of external part elements 4 comprising at least one pattern 10 within this automatic assembly installation.

The watch 100 consists of external part elements 4 and horological components (not shown) which are assembled together. In this context, the external part elements 4 can be visible or observable elements of the watch 100 when the latter is worn by the user also known as the wearer. In terms of horological components, they comprise non-restrictively and non-exhaustively elements forming the horological movement, the joints and/or rings comprised in this watch

100. Under these conditions, it is therefore understood that each dial 4 is among the elements of the watch 100 which surround the horological movement and which gives the watch the external appearance, visual appeal and style thereof. For example, this dial 4 can be non-restrictively and non-exhaustively a dial, a flange, a bezel, etc.

Figure 9:
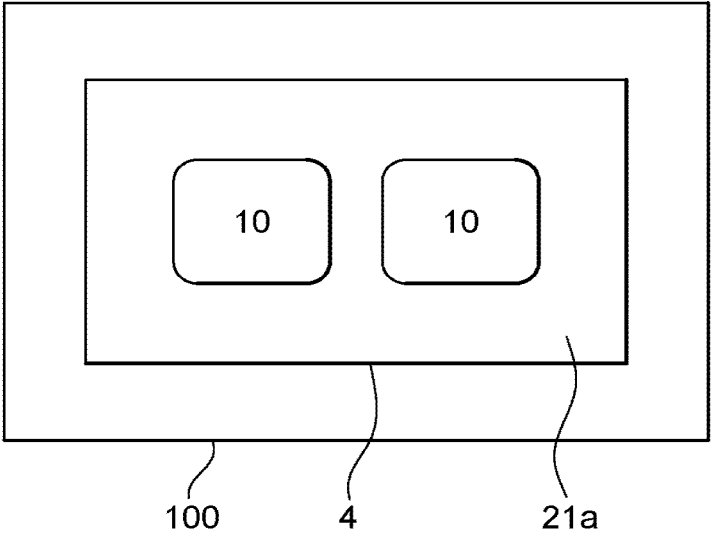
FIG. 9 represents a watch comprising a dial provided with at least one pattern, according to an embodiment of the invention.

It will be noted that in the embodiment described and with reference to FIG. 9, the dial 4 is here the dial of the watch 100 and the pattern 10 is an applique of this dial.

As we mentioned above, this dial 4 also comprises a so-called hidden face 21b, also referred to as bottom face, which is an opposite face of the visible face 21a (visible in FIGS. 4 to 8).

Figure 3:
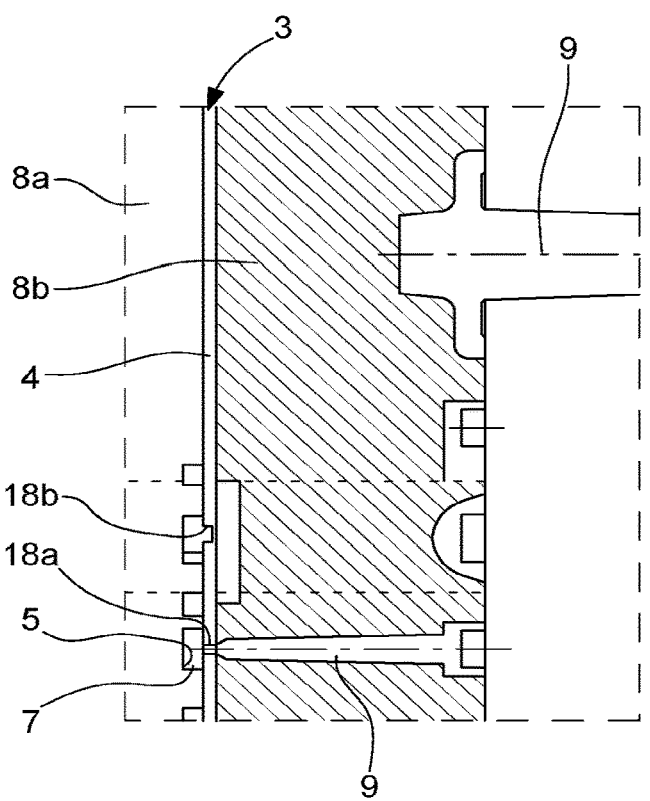
FIG. 3 is a sectional view of a part of a mould of the system, according to the embodiment of the invention.
Figure 4:
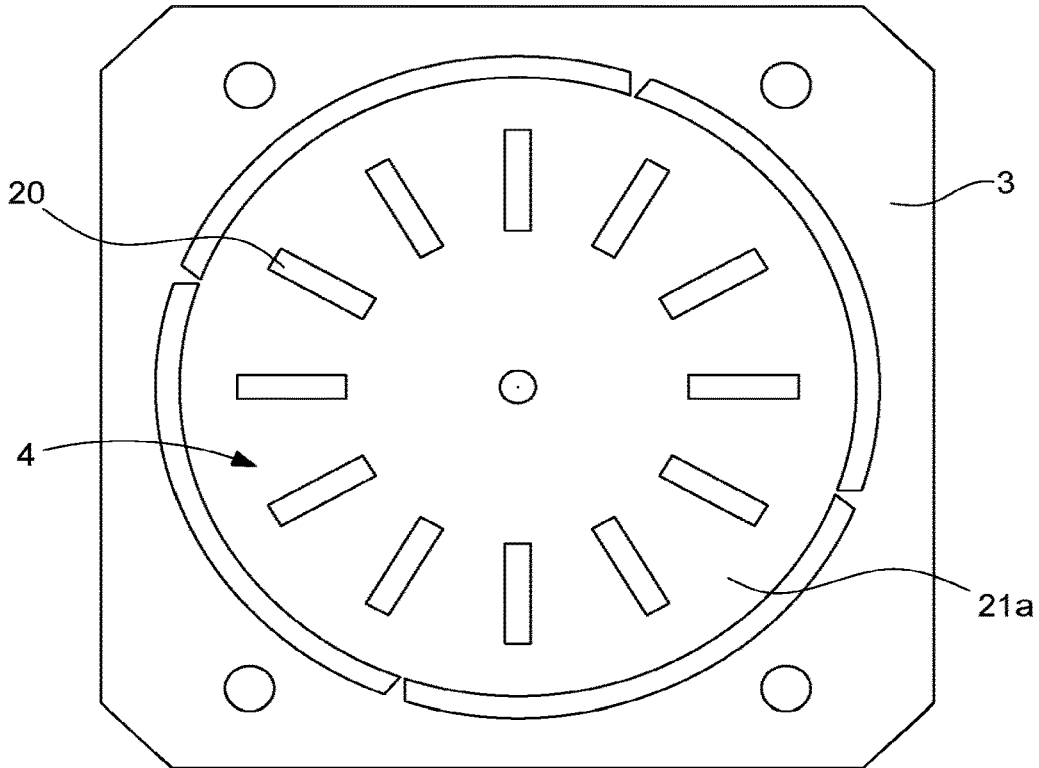
FIG. 4 is a representation of a support plate comprising the watch dial blank, in this figure, a visible face of this dial blank can be seen, provided with several pattern blanks, such as appliques, over-moulded on this face, according to the embodiment of the invention.
Figure 5:
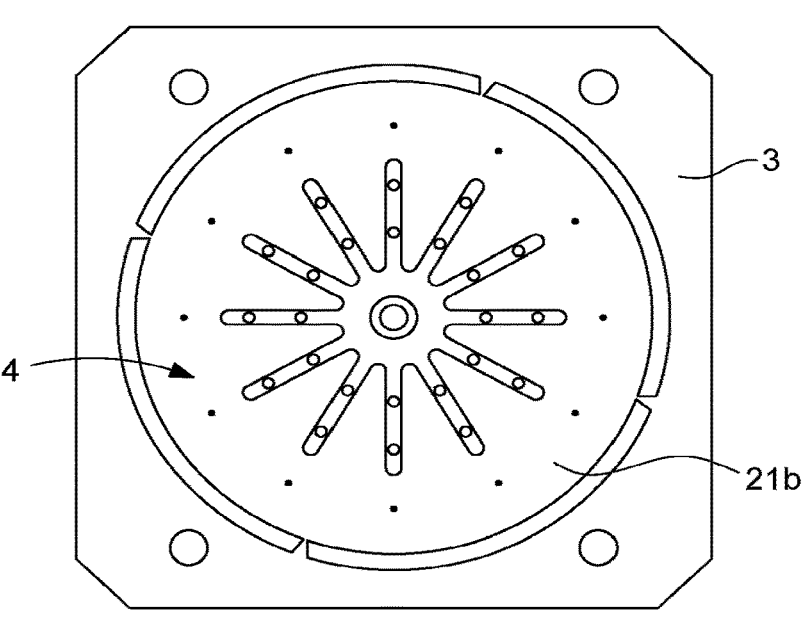
FIG. 5 is a representation of the support plate comprising the watch dial blank, in this figure, a hidden face of this dial blank can be seen, which is connected to a sprue essentially formed by a second part of the mould not shown, according to the embodiment of the invention.

With reference to FIGS. 1 and 3, this system 1 comprises non-exhaustively and non-restrictively:

a mould 2 formed by the reversible assembly of a first part 8a with a second part 8b capable of receiving a support plate 3 comprising at least one dial blank 4.

a device for injecting 11 an injectable material into this mould 2;

a device for applying 12 a coating on a blank of the pattern 10 over-moulded on the dial blank 4. The device for applying 12 a coating onto said blank 20 over-moulded on the visible face 21a of the dial blank 4 helping finalise this blank 20 of the pattern 10;

a device for designing 13 an original or "master" part in relation to the pattern 10 to be manufactured, particularly implementing lithography techniques in particular ultraviolet project optical lithography, deep ultraviolet (DUV) projection optical lithography, immersion lithography, double exposure lithography, extreme ultraviolet lithography and/or nanoimprint lithography;

a device for preparing 14 said at least one pattern 10 from the original part particularly implementing Ni-shims or BMG replication techniques;

a device for evacuating 15 said mould 2 and/or a device for regulating 16 the temperature inside this mould 2;

a device for removing and arranging 17a the support plate 3 of at least one dial blank 4 in the mould 2, and a device for designing 17b the support plate.

In this configuration, the device for designing 17b the support plate comprises:

a module for producing several through holes in the thickness of the body of a support plate, said holes delimiting in such a plate the edge of the dial blank;

a module for creating at least one through opening 18a and at least one blind opening 18b in the thickness of the dial blank;

a module for applying at least one coating on a top face of this dial blank.

In this device 17b, the application module is particularly provided with an organ for ejecting this decorative and/or functional material, and/or an organ for vaporising such a material and/or an organ for vaporising a coat/film including such a material. It will be noted that this module is also capable of performing this application by PVD or lacquering or cellulose varnishing.

In system 1, this mould 2 comprises a bed formed by the assembly of the first part 8a with the second part 8b and wherein the support plate 3 comprising the dial blank 4 is capable of being arranged. It is understood that the plate 3 can comprise a single dial blank 4 or in an alternative several external part elements 4.

In this mould 2, the second part 8b comprises a receiving face configured to receive such a support plate 3. More specifically, the support plate 3 is fitted on the receiving face of the second part 8b such that the hidden face 21b of the dial blank 4 is arranged facing or in contact with all or part of this receiving face. In this configuration, the visible face 21a of the dial blank 4 is for its part facing and in contact with an inner face of the first part 8a. In other words, the support plate 3, and therefore the dial blank 4, is arranged in the bed of this mould 2 while being sandwiched between the first and second parts 8a, 8b of this mould 2.

The inner face of this first part 8a of the mould 2 can comprise a single impression 5 or several impressions 5 each in relation to a pattern 10 to be over-moulded on the visible face 21a of the dial blank 4. These impressions 5 each have a hollow shape defined in this planar inner face of the first part 8a.

The visible face 21a of the dial blank 4 comprises a zone 6, also referred to as over-moulding zone 6, which is defined to form with said impression 5 a cavity 7 wherein an injectable material is injected, so as to contribute to the design of said blank 20 of the pattern 10. This cavity 7 defines the final shape of said blank 20 and therefore of the pattern 10 which are produced by the cooperation of the impression 5 and the corresponding zone 6 of the visible face 21a of the dial blank 4. In this configuration, this zone 6 is therefore arranged facing said impression 5 when the first part 8a and the dial blank 4 are assembled together. It will be noted that the mould 2 comprises as many cavities 7 as this first part 8a includes impressions 5 and/or as the dial blank 4 comprises over-moulding zones 6.

In this context, when the system 1 is provided with the device 16 for regulating the temperature inside said mould 2, the first part 8a can then comprise an injection circuit (not shown) defined in the body of this first part 8a which is essentially arranged below each impression 5. Such a circuit is connected to the temperature regulation device 16 which is then capable of generating the circulation of a cooling fluid or a heating fluid in this circuit.

In the dial blank 4 comprised in the support plate 3, the visible face 21a and the hidden face 21b are preferably planar. These visible and hidden faces 21a, 21b are also referred to respectively as the top and bottom faces of the dial blank 4. In this mould 2, the visible face 21a of this dial blank 4 is capable of being in contact with the inner face of the first part 8a when this first part 8a is assembled with the second part 8b. In this configuration, it is understood that the dial blank 4 is arranged in this mould 2 while being sandwiched between these first and second parts 8a, 8b.

With reference to FIG. 3, this dial blank 4 also comprises at least one through opening 18a, also referred to as through channel or through hole, connecting the hidden face 21b of the dial blank 4 to the receiving face of the second part 8b, this through opening 18a comprising a first end, referred to as exit orifice, opening into the cavity 7 of the mould 2 and a second end opening onto the hidden face 21b of the dial blank 4 referred to as the entry orifice. It is understood that the dial blank 4 comprises at least as many through openings 18a as the mould 2 comprises cavities 7.

Figure 7:
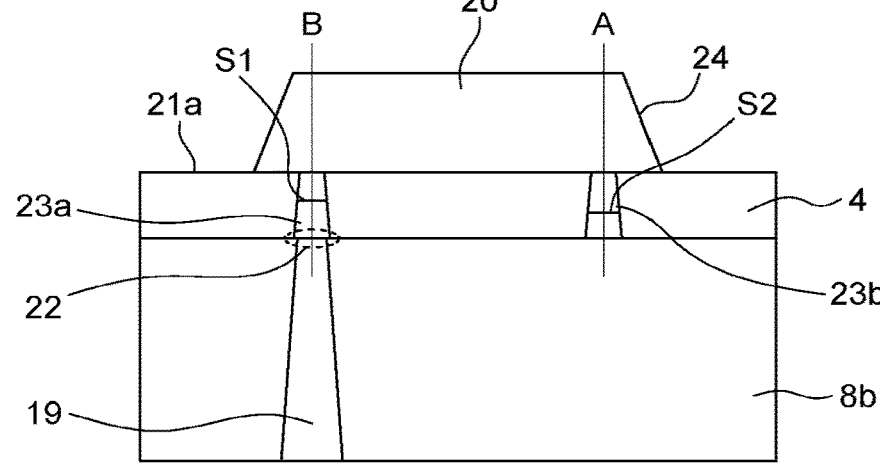
FIGS. 7 and 8 are sectional views of different alternative embodiments of pattern blanks over-moulded on the dial blank, according to the embodiment of the invention.
Figure 8:
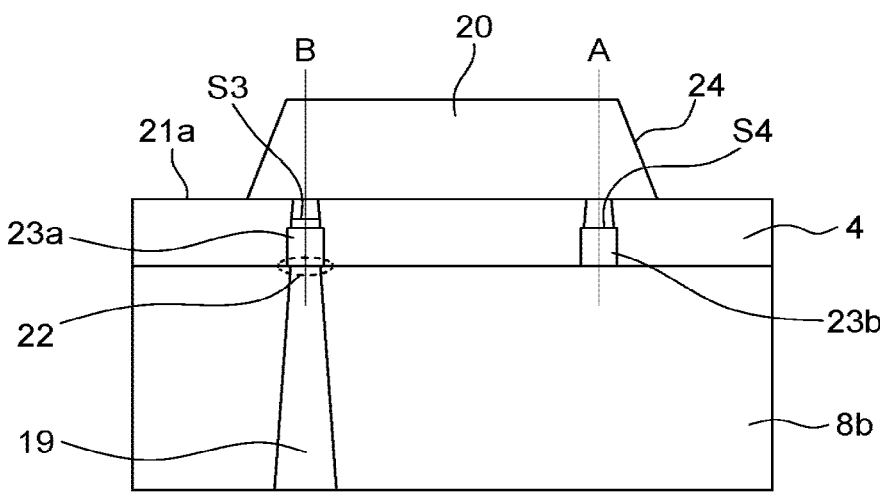

It will be noted with reference to FIGS. 7 and 8 that in this dial blank 4, the through opening 18a comprises the injectable material helping to form a foot 23a, of the pattern 10. This foot 23a is configured particularly in the shape thereof to secure this pattern 10 in the body of the dial blank 4. Moreover, the zone 6 which is provided to form with said impression 5 the cavity 7, can comprise in addition to this through opening 18a, a blind opening 18b, also referred to as blind hole, comprising an entry orifice defined in the visible face 21a of the dial blank 4. Such a blind opening 18b comprising injectable material helps form another foot 23b of the pattern 10 which is also configured particularly in the shape thereof to secure this pattern 10 in the body of the dial blank 4.

In this context, the body of these through and blind openings 18a, 18b is formed from a set of axial cross-sections S1, S2, S3, S4 which are perpendicular to a longitudinal axis A, B of these openings 18a, 18b. In this configuration, the through opening 18a extends along the longitudinal axis A interconnecting the centres of the entry and exit orifices. In terms of the blind opening 18b, it also extends along the longitudinal axis B interconnecting the centres of the injectable material entry orifice and the bottom of this opening 18b. These longitudinal axes A, B are substantially parallel or strictly parallel with each other. In this configuration, it will be noted that:

the through opening 18a comprises at least one axial cross-section S1, S3 between the entry orifice and the exit orifice, the surface area whereof is strictly different or substantially different from an axial cross-section comprising the entry orifice and a surface area of an axial cross-section comprising the entry orifice and a surface area of an axial cross-section comprising the exit orifice;

the through opening 18a comprises at least one axial cross-section S1, S3 between the entry orifice and the exit orifice, the surface area whereof is strictly different or substantially different from an axial cross-section comprising the entry orifice or a surface area of an axial cross-section comprising the entry orifice or a surface area of an axial cross-section comprising the exit orifice;

the through opening 18a comprises at least one axial cross-section S1, S3 between the entry orifice and the exit orifice, the surface area whereof is strictly greater or substantially greater than a surface area of an axial cross-section comprising the exit orifice, and/or strictly less or substantially less than a surface area of an axial cross-section comprising the entry orifice;

the blind opening 18b comprises at least one axial cross-section S2, S4 between the entry orifice and the bottom, the surface area whereof is strictly different or substantially different from an axial cross-section comprising the entry orifice and a surface area of an axial cross-section comprising the entry orifice and a surface area of an axial cross-section comprising the bottom;

the blind opening 18b comprises at least one axial cross-section S2, S4 between the entry orifice and the bottom, the surface area whereof is strictly different or substantially different from an axial cross-section comprising the entry orifice or a surface area of an axial cross-section comprising the entry orifice or a surface area of an axial cross-section comprising the bottom;

the blind opening 18b comprises at least one axial cross-section S2, S4 between the entry orifice and the bottom, the surface area whereof is:

strictly greater or substantially greater than a surface area of an axial cross-section comprising the exit orifice, and/or strictly less or substantially less than a surface area of an axial cross-section comprising the entry orifice.

In this context and for example, in FIG. 7, the through opening 18a and the blind opening 18b can have an essentially frustoconical shape or a shape similar to that of a tube in which the body comprises two parts having different cross-sections or different diameters as represented in FIG. 8.

As we have mentioned, the mould 2 comprises at least one cavity 7. This cavity 7 is formed by the assembly of the impression 5 comprised in the inner face of the first part 8a with the corresponding zone 6 of the visible face 21a of the dial blank 4. The zone 6 comprises the through opening 18a arranged in the dial blank 4 which opens via the exit orifice thereof into the cavity 7. This through opening 18a is connected/linked via the entry orifice thereof to the injectable material injection device 11, via the injection circuit 9 defined in the second part 8b of the mould 2. It will be noted that in this configuration, when the cavity 7 also comprises a blind opening 18b, the entry orifice of this opening is then defined in the over-moulding zone 6 of the visible face 21a of the dial blank 4.

In this configuration, the portion of injectable material which is solidified in the entry orifice of the through opening 18a forms an injection point 22 which is defined to be broken particularly during the detachment of the dial blank 4 with the second part 8b as described hereinafter. Indeed, this injection point 22 helps hold the support plate 3, and therefore the dial blank 4, on the second part 8b by linking it to a sprue 19 formed in this mould 2. This injection point 22 is located preferably at the entry orifice of the through opening 18a. In other words, this injection point 22 is located at the end or at the base of the foot 23a, formed in the through opening 18a, of this pattern 10.

Figure 6:
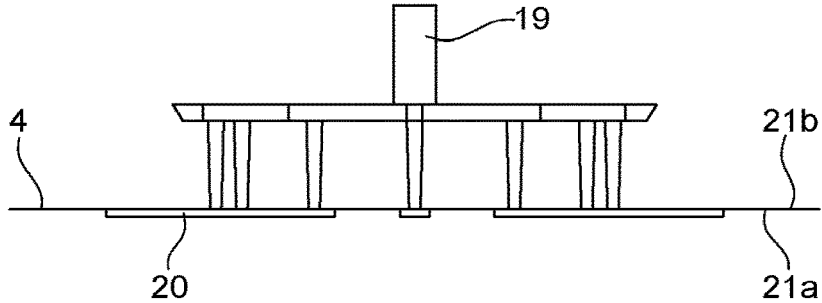
FIG. 6 is a profile view of the support plate comprising the dial blank as well as a sprue formed in the mould, according to the embodiment of the invention.

It will be noted that this sprue 19 which can be seen in FIG. 6, comprises a first part formed by the solidification of the injectable material in the through opening 18a and a second part formed by the solidification of the injectable material in the injection circuit 9 arranged in the second part 8b.

Furthermore, in this configuration, it is understood that the impression 5 forms the visible part of the pattern 10 such as an applique, and the corresponding zone 6 of the dial blank 4 for its part helps form the linking part of this applique with the dial blank using the feet 23a, 23b of this applique.

As we have already mentioned, in this mould 2, the second part 8b is provided to be assembled reversibly with an assembly face of the support plate 3 and/or with the hidden face 21b of the dial blank 4. This second part 8b comprises said at least one injectable material injection circuit 9 connected at a first end to the injection device 11 and at a second end to each through opening 18a of the dial blank 4 of the support plate 3. It will be noted that then the system 1 is provided with the device for evacuating 15 said mould 2, a vacuum circuit can be defined in the body of the second part 8b which is connected at one end to a through opening 18a of the dial blank 4 as well as at another end to this evacuation device 15, said device 15 thus being capable of causing an air space in each cavity 7 of the mould 2. In this configuration, it is understood that one of the functions of the second part 8b is that of providing the routing of the injectable material to the through opening 18a for injecting material and help where applicable to evacuate the cavity 7 of the mould 2.

In this system 1, the device for applying 12 a coating on a blank 20 of the pattern 10 over-moulded on the dial blank 4 is capable of applying/depositing a coating comprising a metallic type decorative material and/or a functional material on an outer surface 24 of the blank 20 of this pattern 10. Such a device 12 can comprise a printing module provided particularly with an organ for ejecting this decorative and/or functional material, and/or an organ for vaporising such a material and/or an organ for vaporising a coat/film including such a material. It will be noted that the vaporising organ can be a direct current cathode sputtering organ or a high-power impulse magnetron sputtering organ better known as the acronym HIPIMS. It will be noted that other techniques can be used such as those referred to as "hot transfer" of the coating onto the blank 20.

In this system 1, the decorative material can be formed from an ink, or from a metal or a metal alloy. This decorative material helps modify the visual appearance of the pattern 10 by being applied on the blank 20 of this pattern 10. In terms of the functional material, it is intended to give the pattern 10 physical and/or chemical functional characteristics linked for example with:

electrical conductivity, semiconductor or insulating nature;

semi-conductivity;

electroluminescence;

photoluminescence (for example a reaction to ultraviolet radiation);

phosphorescence;

"X-chromism" (photochromic, electrochromic, thermochromic, ionochromic, mechanochromic, etc.);

electroactivation;

magnetism;

etc.

In this system 1, the injectable material is for example an organic and/or composite material, or a metallic or ceramic material or a thermodeformable, thermosetting, or thermoplastic material. By way of examples, this material can comprise the following elements:

SLN (phosphorescent) type charged plastic and colour and/or fluorescent pigments;

polymer charged with ceramic with and without colour pigment;

an additive for giving a metallic/glossy appearance, such as aluminium powder, metallic powder;

additive for making the polymer conductive (for technical reasons or for a chemical/galvanic or other post-treatment);

additive giving an aesthetic finish imitating a material (nacre, stone, etc.);

additive giving specific mechanical and/or tribological characteristics;

BMG better known under the acronym "Bulk Metallic Glass";

stainless material;

sinterable metallic material;

ceramic;

silicon, and/or combination of one or another of these elements with each other or several thereof with each other.

In this configuration, it is understood that such a system 1 can make it possible to manufacture several patterns 10 over-moulded simultaneously on the visible face 21a of the dial blank 4. For this purpose, the first part 8a then comprises several impressions 5 and is capable of helping particularly with the dial blank 4 obtain a series of patterns 10 over-moulded on the visible face 21a of this dial blank 4. Alternatively, it is understood that the first part 8a can comprise a single impression 5 relative to a blank of the pattern 10 over-moulded in the visible face 21a of the dial blank 4.

With reference to FIG. 2, this system 1 implements a process for manufacturing a watch (100) dial (4) comprising at least one pattern (10) on a visible face (21a) of the dial (4).

Such a process also comprises a step of designing 25 the support plate 3 comprising the dial blank. Said step 25 comprising a sub-step of producing 26a several through holes in the thickness of the body of the support plate, said holes delimiting in such a plate the edge of a dial blank. In this configuration, the dial blank is held to the rest of the body of the plate by parts of this plate each comprised between two holes.

This step 25 then comprises a sub-step of creating 26*b* at least one through opening 18*a* and at least one blind opening 18*b* in the thickness of the dial blank. As we have already mentioned, such an opening 18*a* is provided to subsequently connect the hidden face 21*b* of the dial blank 4 to the face for receiving the second part 8*b* of the mould.

This step 25 subsequently comprises a sub-step of applying 27 at least one coating on a top face of this dial blank. It will be noted that this top face corresponds to the visible face of the dial blank obtained in the support plate after this design step 25. During this sub-step 27, several coats can be applied on this visible face.

By way of example, this sub-step 27 can comprise a deposition phase 28 of at least one decorative coat of a translucent or transparent or coloured material. This said at least one decorative coat can also comprise a functional material aimed at giving the final dial blank and in particular the visible face thereof physical and/or chemical functional characteristics linked for example to:

electrical conductivity, semiconductor or insulating nature
  semi-conductivity;
  electroluminescence;
  photoluminescence (for example a reaction to ultraviolet radiation);
  phosphorescence;
  "X-chromism" (photochromic, electrochromic, thermochromic, ionochromic, mechanochromic, etc.);
  electroactivation;
  magnetism;
  etc.

In addition, this said at least one coat can comprise an acrylic or epoxy varnish and/or an oxidation-resistant material when the dial blank is made of metallic material.

As we have seen, such a design step 25 thus makes it possible to obtain the support plate comprising the dial blank, using a plate made of metallic material, metal alloy and/or polymer, in which plate the dial blank has been produced. This support plate is then used for producing at least one pattern which can be two-dimensional or three-dimensional, on the visible face of the dial blank 4.

More specifically, the process subsequently comprises a sub-step 29 of producing at least one pattern on a visible face of the watch dial blank 4. This step 29 comprises a step 30 of preparing at least one impression 5 in the first part 8*a* using at least one original part relative to said at least one pattern 10 to be manufactured. It is understood that this step 30 is capable of helping produce as many impressions 5 as there are patterns 10 to produce, such that such impressions 5 are over-moulded on the same dial blank 4. This step 30 provides the production of an impression 5 from an original part also referred to as "master". This original part has a similar shape to that of the pattern 10 to be produced. It will be noted that the implementation of this step 30 can require as many original parts as there are impressions 5 to be produced.

In this context, the preparation step 30 comprises a sub-step 31 of designing said original part implemented using a lithography technique. This lithography technique is chosen from the following techniques known from the prior art which are not described in more detail here: ultraviolet optical projection lithography, DUV projection optical lithography, immersion lithography, double exposure lithography, extreme ultraviolet lithography, nanoimprint lithography.

This preparation step 30 then comprises a sub-step 32 of replicating the original part aimed at producing the external part element 5 by reproducing a negative shape of the original part. This sub-step 32 in particular provides the implementation of Ni-shims or BMG (acronym of "Bulk Metallic Glass") techniques known from the prior art which are not described in more detail here.

Subsequently, the process includes an arrangement step 33 in the mould 2 of the support plate 3 comprising the dial blank 4, said mould 2 being formed by the reversible assembly of the first and second parts 8*a*, 8*b*. During this step 33, the support plate 3 is positioned in the bed defined by the reversible assembly of these first and second parts 8*a*, 8*b*. Such an arrangement step 33 comprises a reversible assembly sub-step 34 of the second part 8*b* with the support plate 3 comprising this dial blank 4. This sub-step 34 comprises a connection phase 35 of one end of the injection circuit 9 arranged in this second part 8*b* with the entry orifice of the through opening 18*a* of the dial blank 4. Such a sub-step 34 helps make an optimal connection between the end of the injection circuit 9 arranged in this second part 8*b* with the through opening 18*a* defined in the dial blank 4 and in particular with the entry orifice of this opening 18*a*. It is understood that this circuit 9 includes as many ends as the dial blank 4 comprises entry orifices of through openings 18*a*. It will be noted that the entry orifice is comprised in the hidden face 21*b* of the dial blank 4. Such an arrangement step 33 also comprises a sub-step of forming 36 at least one cavity 7 in this mould 2 by associating the first part 8*a* including at least one impression 5 with the visible face 21*a* of the dial blank 4. It will be noted that each cavity 7 is defined for the preparation/formation of the blank 20 of the pattern 10. In other words, this cavity 7 of the mould 2 by being formed by associating at least one impression 5 of the first part 8*a* of the mould 2 with the visible face 21*a* of the external part element of this mould 2, defines a space corresponding to the volume and to the shape of the blank 20 of the pattern 10 which is produced here.

The process then comprises a step of constructing 37 said at least one blank 20 relative to the pattern 10 on the visible face 21*a* of the dial blank 4. This step 37 comprises an over-moulding sub-step 38 by injecting injectable material into the cavity 7 via a through opening 18*a* arranged in said dial blank 4 provided with an entry orifice of said cavity 7. The aim of this sub-step 38 is that of carrying out an over-moulding of the blank 20 of the pattern 10 on the corresponding zone 6 of the visible face 21*a* of the dial blank 4. Such a sub-step 38 comprises an injection phase 39 into this cavity 7 of the injectable material from the device 11 for injecting this material. In this context, the injectable material from the injection device 11 is introduced into the cavity 7 by passing through the injectable material injection circuit 9 defined in the second part 8*b* and the through opening 18*a* comprised in the dial blank 4 connecting this injection circuit 9 to said cavity 7. Thus, the injectable material then occupies the entire volume defined in the cavity 7 by over-moulding the corresponding zone 6 of the visible face 21*a* of the dial blank 4 arranged facing the impression 5, with a view to forming this blank 20 of the pattern 10.

Such an over-moulding step 38 can comprise the following phases:

a phase of evacuating 40 said cavity 7 before carrying out the phase of injecting 39 the injectable material into this cavity 7, and/or a phase of regulating 41 the temperature of the cavity 7 particularly during a period spreading from before the start of the phase of injecting 39 injectable material into the cavity 7 to the end of this material injection phase 39 or after this end of this injection phase 39.

Such phases of evacuation 40 and temperature regulation 41 are aimed at ensuring a structuring homogeneity of the blank 20 of the pattern 10 during the over-moulding thereof on the dial blank 4 in order to remove the presence of any defect capable of being present on the visible outer face of this blank 20. Such a defect can for example consist of the presence of a weld line on the visible outer face of the blank 20, formed following the joining of two flows of injectable material into the cavity 7. Such a weld line is often present on blanks 20 of patterns 10 relative to appliques having the shape of a 6, 8 or 0 numeral.

During the implementation of the evacuation phase 40, the fluid present in the cavity 7 for example a gas such as air is then evacuated from the cavity 7 before carrying out the injection phase 39.

When carrying out the temperature regulation phase 41 of the cavity 7, the temperature in the cavity 7 is then heated to a temperature which is greater or substantially greater than the temperature of the injectable material from the device 11 for injecting this material, before carrying out the injection phase 39. Subsequently, one the injectable material injection phase 39 has been carried out i.e. completed, the cavity 7, is cooled immediately.

The process then comprises a finalisation step 42 of said at least one blank of the pattern 10. This step 42 comprises an application sub-step 43 of a coating on all or part of said blank 20 of this pattern 10 over-moulded on the dial blank 4. Such an application sub-step 43 is implemented after carrying out of the following sub-steps of this finalisation step 42:

a sub-step of disassembling 44 the first part 8*a* from the second part 8*b* of the mould 2, or a sub-step of removing 45 of removing said mould 2 from the support plate 3 comprising the dial blank 4 provided with said at least one blank 20 of the pattern 10 over-moulded on the visible face of this dial blank 4.

Indeed, following one or the other of these two sub-steps 44, 45, the application sub-step 43 comprises a deposition phase 46 of the decorative and/or functional material on the visible outer face of each blank 20 of the pattern 10 over-moulded on this dial blank 4. For example, this deposition phase 46 can provide the application on this outer face of the blank 20 of a decorative material comprising a metallic composition. Such a deposition phase 46 can then be carried out according to a technology implementing direct current cathode sputtering or high-power impulse magnetron sputtering better known under the acronym HIP-IMS.

It will be noted that when application sub-step 43 is carried out following the disassembly sub-step 44 of the first part 8*a* from the second part 8*b* of the mould 2, the deposition phase 46 is performed with the support plate 3 which is still fitted/fastened on the second part 8*b* of the mould 2. Furthermore, in this context, following this deposition phase 46, the process provides the implementation of the removal sub-step 45 of the support plate 3 from the mould 2.

In this process, the removal sub-step 45 comprises a breaking phase 47 of the injection point 22 linking the support plate 3 and/or the dial blank 4, comprising the blank 20 of the pattern 10 or the pattern 10, to the second part 8*b*. This phase 47 comprises a sub-phase of applying 48 a force on the support plate 3 comprising this dial blank 4 aimed at triggering a rotation or translation movement of this plate relative to the second part 8*b* and thus triggering the break of this injection point 22. It will be noted that once the injection point 22 has been broken, the base of the foot of the pattern 10 formed in the through opening 18*a* is substantially level with the hidden face 21*b* of the dial blank 4 or strictly level with this hidden face 21*b*.

Once the support plate 3 has been removed from this second part 8*b*, the dial blank 4 is then separated from the support plate 3 in order to be fitted in a watch or to be in turn finalised by applying a coating layer on the remaining visible face 21*a* i.e. on the portion of this face 21*a* which is not concealed by the pattern(s) 10.

It will furthermore be noted as we mentioned above that each dial 4 can comprise several patterns 10 and under these conditions as many injection points 22 as there are patterns 10.

Thus, the invention thus helps produce at least one pattern 10 on the visible face 21*a* of external part elements 4 of timepieces.

The invention claimed is:

1. A process for manufacturing a watch dial comprising at least one pattern on a visible face of the dial, said process comprising:

a step of designing a support plate comprising a dial blank, said step comprising producing several through holes in a thickness of a body of the support plate, said holes delimiting in the support plate an edge of the dial blank, and a step of producing at least one pattern on the visible face of said dial blank during which the following is performed:

an arrangement step of arranging said support plate comprising the dial blank in a mould formed by the reversible assembly of a first part and a second part, said arrangement step comprising a sub-step of forming at least one cavity in said mould by associating the first part including at least one impression with the visible face of the dial blank;

a construction step of constructing a blank of each of the at least one pattern on the visible face of the dial blank, said construction step comprising a sub-step of over-moulding by injecting an injectable material into the cavity via a through opening arranged in said dial blank provided with an entry orifice of said cavity;

a finalization step of finalizing the blank of the pattern comprising a sub-step of removing said mould from the support plate comprising the dial blank provided with the blank of the at least one pattern over-moulded on the visible face thereof, wherein said removal sub-step comprises breaking the injectable material at an injection point connecting said dial blank to the second part, wherein said injectable material at said injection point is broken such that a base of a foot formed by the at least one pattern is level with a hidden face of the dial blank.

2. The process according to claim 1, wherein the design step comprises a sub-step of creating at least one of the through opening and at least one blind opening in the thickness of the dial blank.

3. The process according to claim 1, wherein the design step comprises a sub-step of applying at least one coating on the visible face of said dial blank.

4. The process according to claim 1, wherein said arrangement step comprises a reversible assembly sub-step of the second part with the support plate comprising the dial blank, said sub-step comprising connecting one end of an injection circuit arranged in said second part with the entry orifice of the through opening of the dial blank.

5. The process according to claim 1, wherein the over-moulding sub-step comprises regulating the temperature of said mould during a period spreading from before the start of the injecting the injectable material into the cavity to the end of said injecting or after said end of said injecting.

6. The process according to claim 1, wherein the over-moulding sub-step comprises evacuating said cavity before the injecting the injectable material into said cavity.

7. The process according to claim 1, further comprising a step of preparing the at least one impression in the first part using at least one original part.

8. The process according to claim 1, wherein said injectable material at said injection point is broken via a rotational or translational movement of the support plate relative to the second part.

9. The process according to claim 1, wherein the finalisation step comprises a sub-step of applying a coating on all or part of said blank over-moulded on the dial blank after carrying out one of the following sub-steps of said finalisation step:

a sub-step of disassembling the first part from the second part of the mould, or the sub-step of removing said mould from the support plate.

10. The process according to claim 9, wherein the applying sub-step comprises depositing a decorative and/or functional material on a visible outer face of the blank of the pattern over-moulded on the dial blank.

* * * * *